US012051334B2

(12) United States Patent
Songa et al.

(10) Patent No.: US 12,051,334 B2
(45) Date of Patent: Jul. 30, 2024

(54) SYSTEMS AND METHODS FOR ENHANCING DATALINK OPERATION

(71) Applicant: HONEYWELL INTERNATIONAL INC., Charlotte, NC (US)

(72) Inventors: Anil Kumar Songa, Bangalore (IN); Sadguni Venkataswamy, Bangalore (IN); Siddaray Medegar, Bangalore (IN); Suresh Bazawada, Bangalore (IN); Candace Gunning, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 317 days.

(21) Appl. No.: 17/655,915

(22) Filed: Mar. 22, 2022

(65) Prior Publication Data

US 2023/0222923 A1 Jul. 13, 2023

(30) Foreign Application Priority Data

Jan. 7, 2022 (IN) ............................. 202211000999

(51) Int. Cl.
*G08G 5/00* (2006.01)

(52) U.S. Cl.
CPC ......... *G08G 5/0021* (2013.01); *G08G 5/0013* (2013.01)

(58) Field of Classification Search
CPC ........................... G08G 5/0021; G08G 5/0013
See application file for complete search history.

(56) References Cited

U.S. PATENT DOCUMENTS 8,305,208 B2 11/2012 Judd
8,791,840 B2 7/2014 McGuffin et al.
(Continued)

FOREIGN PATENT DOCUMENTS

EP 1318492 A2 6/2003
WO 2008130948 A1 10/2008

OTHER PUBLICATIONS

L3 Harris, Pilot Handbook U.S. Domestic Controller/Pilot Datalink Communications (CPDLC) Operations Jun. 23, 2021, p. 4 (Year: 2021).*

*Primary Examiner* — Nabil H Syed
*Assistant Examiner* — Cal J Eustaquio
(74) *Attorney, Agent, or Firm* — Lorenz & Kopf LLP

(57) ABSTRACT

A flight deck system and method in an aircraft for enhancing controller pilot datalink communication (CPDLC) operation is disclosed. The flight deck system includes a controller configured to: receive a CPDLC message having a CPDLC message type from a flight operation center (FOC) having an FOC name; retrieve an expected response time for the CPDLC message from an expected response time database containing expected response times for a plurality of CPDLC message types for FOCs; generate a timer function that causes the display of a timer (e.g., countdown timer) on an aircraft display device that has a set duration based on the expected response time; signal the aircraft display device to display the timer; monitor communications from flight crew for a response to the CPDLC message; and signal the aircraft display device to end the display of the timer when a communication has been detected within the set duration.

19 Claims, 4 Drawing Sheets

(56) References Cited

U.S. PATENT DOCUMENTS

| | | | |
|---|---|---|---|
| 9,257,049 | B2 | 2/2016 | Axtell et al. |
| 9,911,337 | B1 | 3/2018 | Shapiro |
| 10,887,255 | B2 | 1/2021 | Thompson |
| 2008/0163093 | A1 * | 7/2008 | Lorido ................. G08G 5/0021 715/771 |
| 2010/0277347 | A1 | 11/2010 | Judd |
| 2013/0141254 | A1 | 6/2013 | McGuffin et al. |
| 2016/0125744 | A1 | 5/2016 | Shamasundar et al. |
| 2017/0039858 | A1 | 2/2017 | Wang et al. |
| 2021/0233412 | A1 | 7/2021 | Bazawada et al. |

* cited by examiner

SYSTEMS AND METHODS FOR ENHANCING DATALINK OPERATION

CROSS-REFERENCE TO RELATED APPLICATION

This application claims priority to India Provisional Patent Application No. 202211000999, filed Jan. 7, 2022, the entire content of which is incorporated by reference herein.

TECHNICAL FIELD

Embodiments of the subject matter described herein relate generally to datalink communication between a flight operation center (FOC) such as an air traffic control (ATC) center and flight crew in an aerial vehicle. More particularly, embodiments of the subject matter relate to systems and methods for enhancing datalink communication operation.

BACKGROUND

Controller Pilot Datalink Communication (CPDLC) is a method by which air traffic controllers can communicate with pilots over a datalink system. Communication with ATC via CPDLC is increasingly being encouraged by international Air Traffic Management authorities as it enhances safety and efficiency by reducing readback errors, reducing language barriers, reducing radio time, and providing more efficient routes (thus reducing fuel usage and flight times). Authorities are increasingly concerned with data communication performance, and many regions monitor communication performance. Transactions times for CPDLC exchanges are recorded for many aircraft. In some instances, aircraft that exhibit poor performance may have various approvals revoked.

Different airspaces require different levels of communication performance, for example, due to differing separation standards and differing densities of air traffic. The oceanic environment is different from the domestic environment. High altitude airspace is different from lower altitude airspace. An acceptable transaction time in one environment may be unacceptable in another. The complexity of a particular CPDLC uplink may require more cognitive workload from the flight crew (e.g., executing an altitude change is less complex than executing a route modification). Thus, authorities from different regions may define different expected pilot response times. Further, authorities within a region may define different expected response times for different CPDLC uplink elements.

Although flight crews are trained to respond to CPDLC uplinks as quickly as they can, they are likely unaware of the expected response time for the current uplink they are working on. Because the expected response may differ based on the airspace in which an aircraft flies, it is more likely that a flight crew may not know the expected response time for an uplink communication.

Hence, it is desirable to provide a system and method for alerting flight crew to the expected time for responding to a particular datalink communication in a particular airspace. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a flight deck system in an aircraft for enhancing controller pilot datalink communication (CPDLC) operation is disclosed. The flight deck system includes a controller configured to: receive a CPDLC message having a CPDLC message type from a flight operation center (FOC) having an FOC name; retrieve an expected response time for the CPDLC message from an expected response time database containing expected response times for a plurality of CPDLC message types for FOCs; generate a timer function that causes the display of a timer (e.g., countdown timer) on an aircraft display device that has a set duration based on the expected response time; signal the aircraft display device to display the timer; monitor communications from flight crew for a response to the CPDLC message; and signal the aircraft display device to end the display of the timer when a communication has been detected within the set duration that is responsive to the CPDLC message.

In another embodiment, a method in a flight deck system in an aircraft for enhancing controller pilot datalink communication (CPDLC) operation is disclosed. The method includes: receiving a CPDLC message having a CPDLC message type from a flight operation center (FOC) having an FOC name; retrieving an expected response time for the CPDLC message from an expected response time database containing expected response times for a plurality of CPDLC message types for FOCs; generating a timer function that causes the display of a timer (e.g., countdown timer) on an aircraft display device that has a set duration based on the expected response time; signaling the aircraft display device to display the timer; monitoring communications from flight crew for a response to the CPDLC message; and signaling the aircraft display device to end the display of the timer when a communication has been detected within the set duration that is responsive to the CPDLC message.

In another embodiment, a non-transitory computer readable medium encoded with programming instructions configurable to cause a controller in a flight deck system in an aircraft to perform a method for enhancing controller pilot datalink communication (CPDLC) operation is disclosed. The method includes: receiving a CPDLC message having a CPDLC message type from a flight operation center (FOC) having an FOC name; retrieving an expected response time for the CPDLC message from an expected response time database containing expected response times for a plurality of CPDLC message types for FOCs; generating a timer function that causes the display of a timer (e.g., countdown timer) on an aircraft display device that has a set duration based on the expected response time; signaling the aircraft display device to display the timer; monitoring communications from flight crew for a response to the CPDLC message; and signaling the aircraft display device to end the display of the timer when a communication has been detected within the set duration that is responsive to the CPDLC message.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
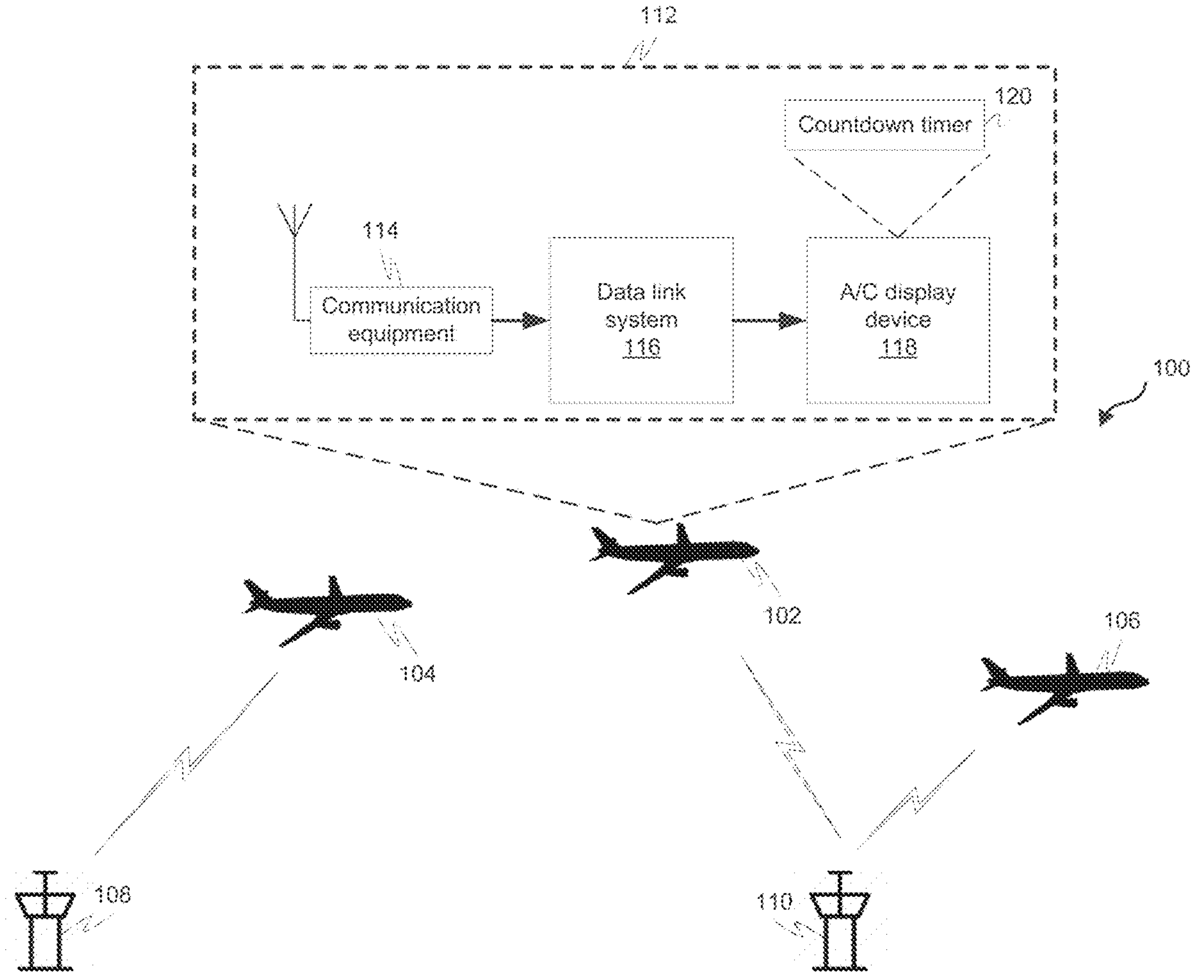
FIG. 1 is a block diagram depicting an example flight environment 100 such as one around a busy aerodrome, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Some regions of the world have mandated the use of CPDLC and restrict certain airspace to CPDLC equipped aircraft. For example, in January of 2020, the North Atlantic (NAT) region from FL290-FL410 mandated use of CPDLC (FANS). Non-compliant aircraft (with a few exceptions for certain military and state aircraft) must fly outside FL290-FL410 or must fly the far northerly 'Blue Spruce' routes. The ACARS network is used for FANS CPDLC (specified in ED-100A/DO-258A) in nearly all oceanic regions, and in extensive domestic airspace including Canada, US, Australia, India, Japan, China, Indonesia, and portions of South America and Africa.

Within the NAT oceanic airspace, certain routes are further restricted to aircraft that not only are FANS-equipped, but further have received PBCS (Performance Based Communication and Surveillance) approval from their regulatory authorities. Reduced Lateral Separation Minima (RLatSM) and Reduced longitudinal Separation Minima (RLongSM) via PBCS standards are defined in ICAO Doc 9869 (PBCS Manual). Aircraft flying in the North Atlantic and Asia Pacific oceanic regions are eligible for reduced separation only if they file their flight plan with a code indicating their regulatory agency has approved them for PBCS operation. Aircraft flying in the NAT or APAC that do not file this code will be controlled via standard separation criteria. In the NAT region, certain highly efficient routes are designated as "PBCS Tracks" and are restricted to PBCS Approved aircraft only.

Authorities are increasingly concerned with data communication performance, and many regions monitor communication performance Transactions times for CPDLC exchanges are recorded for many aircraft. In some instances, aircraft that exhibit poor performance may have its PBCS revoked.

Different airspaces require different levels of communication performance, for example, due to differing separation standards and differing densities of air traffic. The oceanic environment is different from the domestic environment. High altitude airspace is different from lower altitude airspace. An acceptable transaction time in one environment may be unacceptable in another. The complexity of a particular CPDLC uplink may require more cognitive workload from the flight crew (e.g., executing an altitude change is less complex than executing a route modification). Thus, authorities from different regions may define different expected pilot response times. Further, authorities within a region may define different expected response times for different CPDLC uplink elements.

The subject matter described herein discloses apparatus, systems, techniques, and articles for providing a separately loadable Expected Response Time database that can specify various expected response times for a datalink message (e.g., a CPDLC uplink). The disclosed apparatus, systems, techniques, and articles may specify various expected response times for a datalink message based on two inputs—flight operation center (FOC) names (e.g., KUSA (US domestic), EGGX (Shanwick oceanic), CZEG (Edmonton domestic)) and an uplink element numbers (e.g., UM19-CLIMB TO [altitude], UM79-CLEARED TO [position] VIA ROUTE CLEARANCE).

The subject matter described herein further discloses apparatus, systems, techniques, and articles for providing a cockpit timer display that provides a timer (e.g., countdown timer) specific to a current open datalink message. The disclosed apparatus, systems, techniques, and articles may retrieve an expected response time value for the timer from the Expected Response Time database, based on the current active FOC and the current uplink element number.

The disclosed apparatus, systems, techniques, and articles may locate a cockpit timer display in the form of a timer next to an existing forward display Alert that indicates an open CPDLC uplink exists. The disclosed apparatus, systems, techniques, and articles may provide a cockpit timer display in the form of a timer displayed on an existing ATC UPLINK page (e.g., on an MCDU or graphical page, depending on the platform). The cockpit timer display provided by the disclosed apparatus, systems, techniques, and articles may display a message such as text indicating 'Respond ASAP' when the previously displayed timer has expired and the flight crew had not yet responded to the uplink.

FIG. 1 is a block diagram depicting an example flight environment 100 such as one around a busy aerodrome. The example environment 100 includes a plurality of aerial vehicles (ownship aircraft 102 and traffic aircraft 104, 106 in this example), but could include a variety of types of aerial vehicles such as helicopters, UAVs (unmanned aerial vehicles), and others. The example environment 100 also includes a plurality of flight operation centers (FOCs) (e.g., air traffic control towers 108, 110) containing control personnel such as air traffic controllers (ATC) for directing ground and air traffic in the vicinity of the aerodrome.

The example ownship aircraft 102 includes avionics equipment 112 that receives ongoing communications between the aerial vehicles (e.g., 102, 104, 106) and ATC (e.g., via towers 108, 110) using communication equipment 114. The avionics equipment 112 further includes a datalink system 116 that receives datalink communication, such as CPDLC communication, from the communication equipment 114. The example datalink system 116, for datalink communications directed to the ownship, decodes the datalink communications and retrieves message content including an instruction type from the messages and an FOC name. The example datalink system 116 accesses an Expected Response Time database that contains expected response times for a plurality of CPDLC message types for one or more air traffic control centers, generates a timer function that causes the display of a timer 120 (e.g., countdown timer) on an aircraft display device 118 that has a set duration based on the expected response time, and signals the aircraft display device 118 to display the countdown timer 120. The example datalink system 116 further monitors communications from flight crew for a response to CPDLC messages and signals the aircraft display device 118 to end the display of the countdown timer 120 when a communication has been detected within the set duration that is responsive to the CPDLC message. The aircraft display device 118 may be one of many types of graphical display units onboard an aircraft such as a navigation display, a PFD (primary flight display), a PED (personal electronic device), an EFB (electronic flight bag), HUD (heads up display), HDD (heads down display), and others.

Figure 2:
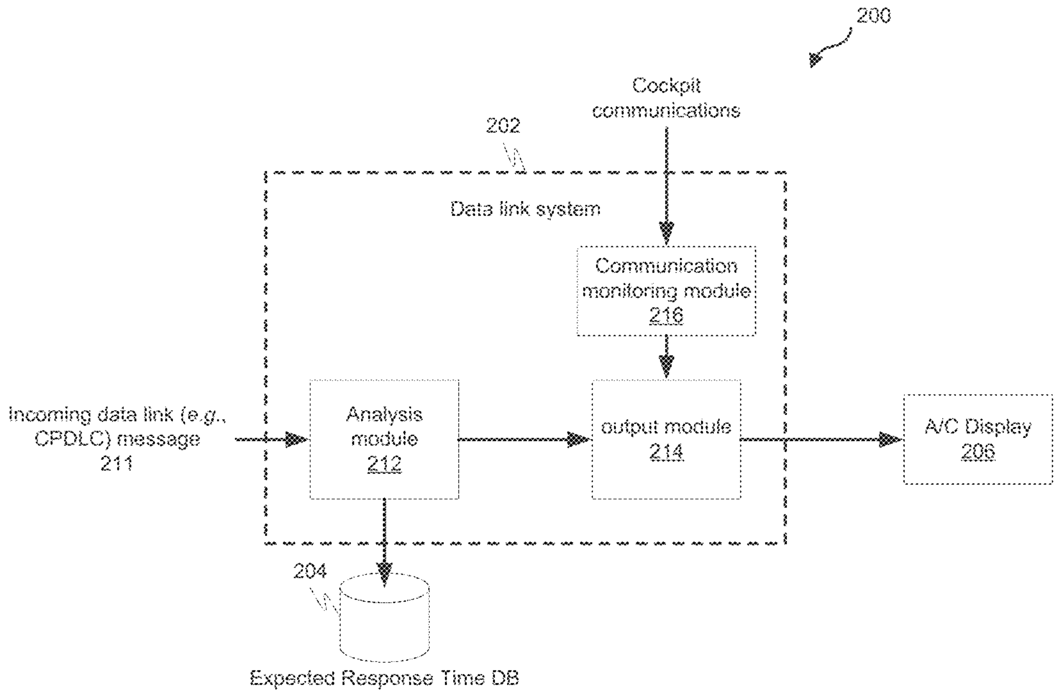
FIG. 2 is a block diagram depicting example avionics equipment, in accordance with some embodiments.

FIG. 2 is a block diagram depicting example avionics equipment 200. The example avionics equipment 200 includes a datalink system 202, and expected response time database 204, an aircraft display device 206. The example datalink system 202 includes an analysis module 212, an output module 214, and a communication monitoring module 216.

Each of the datalink system 202, the analysis module 212, the output module 214, and the communication monitoring module 216 is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The analysis module 212 is configured to receive an incoming datalink message 211, such as CPDLC message, from ownship communication equipment, decode the datalink message 211, determine an expected response time for the datalink message 211, and set a time limit for responding to the datalink message 211. The time limit may be equal to the expected response time or some time less than the expected response time. There may be circumstances wherein the time limit may be greater than the expected response time by some predetermined amount. In each case, the time limit is based on the expected response time.

Through decoding the datalink message 211, the example analysis module 212 is configured to retrieve message content including an instruction type of the datalink message 211 and an FOC name for the datalink message 211. The example analysis module 212 uses the retrieved message content to access (e.g., query) the Expected Response Time database 204, which contains expected response times for a plurality of CPDLC message types for one or more FOCs, to obtain the expected response time for the flight crew to respond to the datalink message 211. The example analysis module 212 can use the instruction type of the datalink message 211 and the FOC name associated with the datalink message 211 to identify the specific expected response time for the datalink message from the Expected Response Time database 204.

The example analysis module 212 may include a keyword spotter and sentence segmentor for deriving segmented text from the datalink message 211 and a semantic/intent/data analyzer for analyzing the segmented text. The semantic/intent/data analyzer may be configured to analyze the segmented text to identify an instruction type for the datalink message 211 and an FOC name for the datalink message 211.

To retrieve an expected response time for a datalink message, the example analysis module 212 may be configured to generate a query request for the expected response time database that includes the FOC name (e.g., for the FOC from which the CPDLC message originated or for the geographical area in which the aircraft is located) and an uplink element number that corresponds to the CPDLC message type of the CPDLC message. To retrieve the expected response time for a datalink message, the example analysis module 212 may be further configured to query the expected response time database 204, using the query request, for an expected response time for the received CPDLC message, and retrieve a query result from the expected response time database 204 that includes the expected response for the CPDLC message.

The example output module 214 is configured to generate a timer function for a graphical display indicator (e.g., a countdown timer) for display on the aircraft display device 206 that indicates how much time the flight crew has left to respond to the datalink message 211. The example output module 214 is configured to set a time limit for display in the graphical display indicator that is equal to the time limit determined by the example analysis module 212.

Figure 3A:
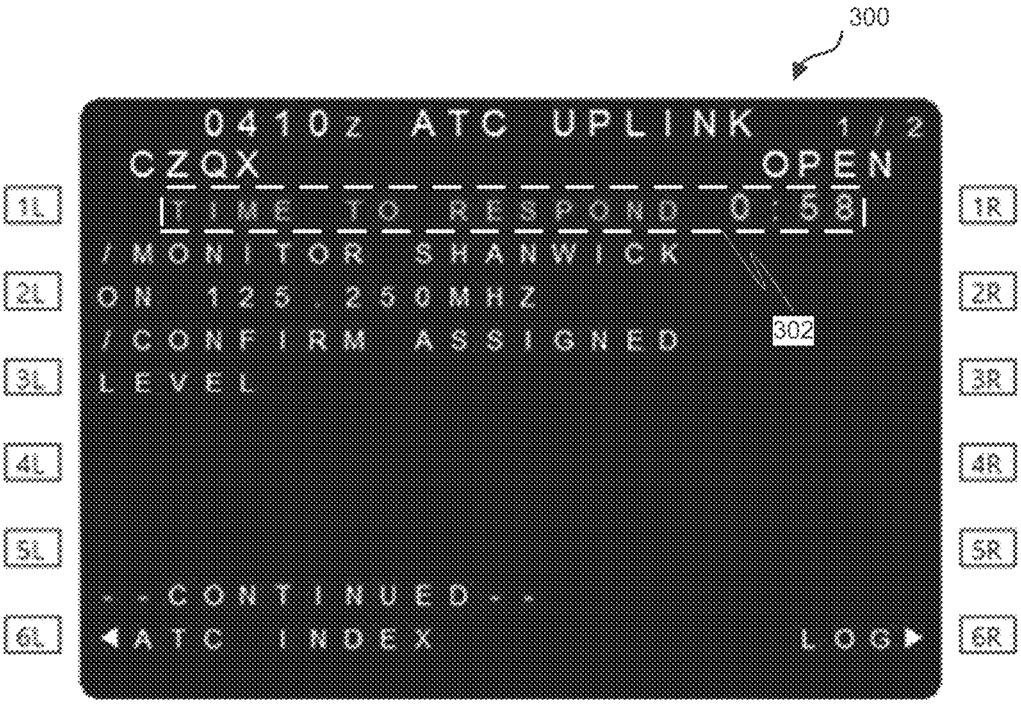
FIG. 3A is a diagram of an example display page on an aircraft display device, in accordance with some embodiments.

The graphical indicator may take many different forms and may be displayed on different aircraft display devices or display device pages. FIG. 3A is a diagram of an example display page 300 on an aircraft display device (e.g., display device 206). The example display page 300 displays information regarding a specific datalink message—0410z ATC uplink. The example display page 300 also displays a graphical display indicator 302 that is specific to a current open uplink and that includes both text that indicates the time left to respond to the datalink message (0410z ATC uplink) and a numeric timer (e.g., countdown timer) that indicates how much of the time limit is left to respond to the datalink message.

Figure 3B:
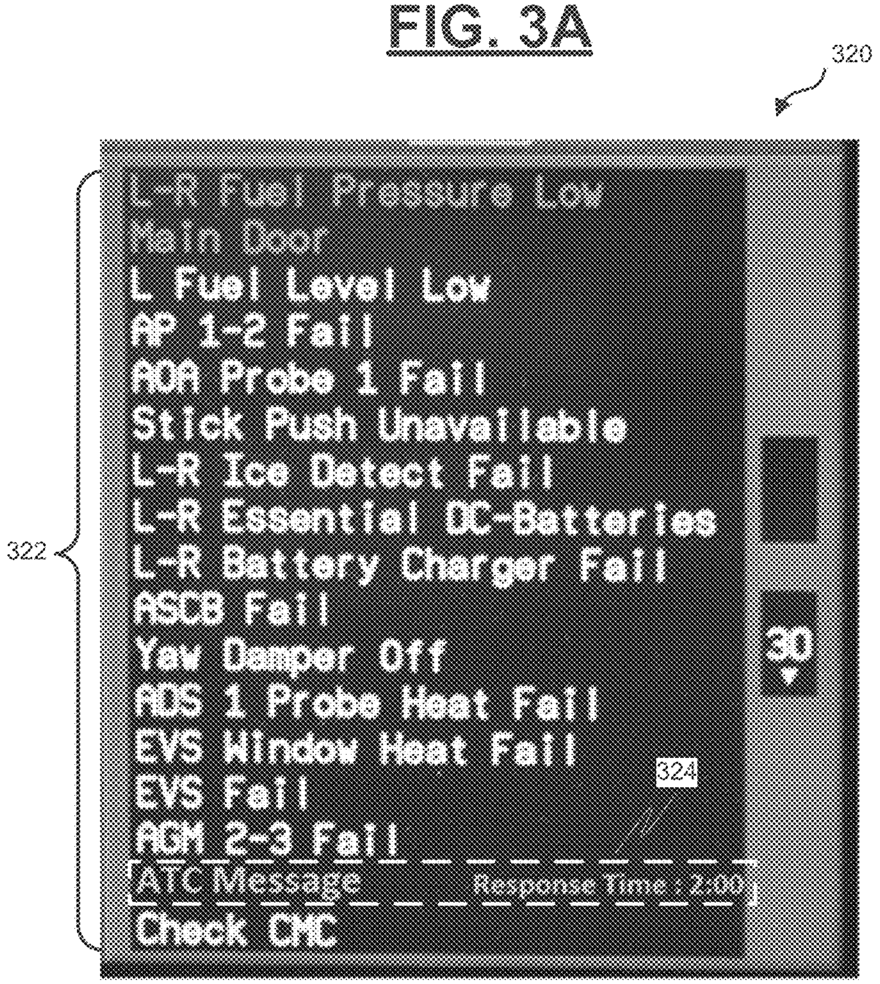
FIG. 3B is a diagram of an example display page on an aircraft display device, in accordance with some embodiments.

FIG. 3B is a diagram of an example display page 320 on an aircraft display device (e.g., display device 206). The example display page 320 displays aircraft status information 322 regarding aircraft systems during flight. Included in the aircraft status information 322 on the example display page 320 is a graphical display indicator 324 that is specific to a current open uplink and that includes text that indicates that the graphical display indicator 324 relates to the remaining response time for an ATC Message and a numeric timer (e.g., countdown timer) that indicates how much of the time limit is left to respond to the datalink message.

Referring back to FIG. 2, the example output module 214 may be further configured to generate a Respond ASAP indication that indicates that a communication has not been detected within the set duration that is responsive to the datalink message. The example output module 214 may be further configured to signal the aircraft display device to display the Respond ASAP indication when a communication has not been detected within the set duration that is responsive to the datalink message. The example output module 214 may be further configured to signal the aircraft display device to end the display of the Respond ASAP indication when a communication has been detected that is responsive to the datalink message. The Respond ASAP indication may include the words "Respond ASAP" or may include other words, phrases, images, etc. that indicate to the flight crew that the timer has expired and that a response is still needed to the datalink message.

The example communication monitoring module 216 is configured to monitor onboard systems for communications from flight crew, determine when a communication is responsive to the datalink message 211, and signal the output module 214 when the flight crew has responded to the datalink message 211. When the example communication monitoring module 216 has detected that the flight crew has responded to the datalink message 211, the output module 214 may terminate a corresponding graphical display indicator (e.g., graphical display indicator 302, graphical display indicator 324, or Respond ASAP indication) and signal the aircraft display device 206 to end the display of the corresponding graphical display indicator.

The example expected response time database 204 may be part of the datalink system 202, located in other equipment onboard the ownship, or may be resident on a cloud-based system. The expected response time database 204 may be preloaded onto the aircraft before flight or downloaded onto the aircraft during flight. The example expected response time database 204 may be searchable via input of an FOC name and an uplink element number for retrieving an expected response time for a specific response time for a specific FOC.

The aircraft display device 206 may be one of many types of graphical display units onboard an aircraft such as a navigation display, a PFD (primary flight display), a PED (personal electronic device), an EFB (electronic flight bag), HUD (heads up display), HDD (heads down display), and others.

Figure 4:
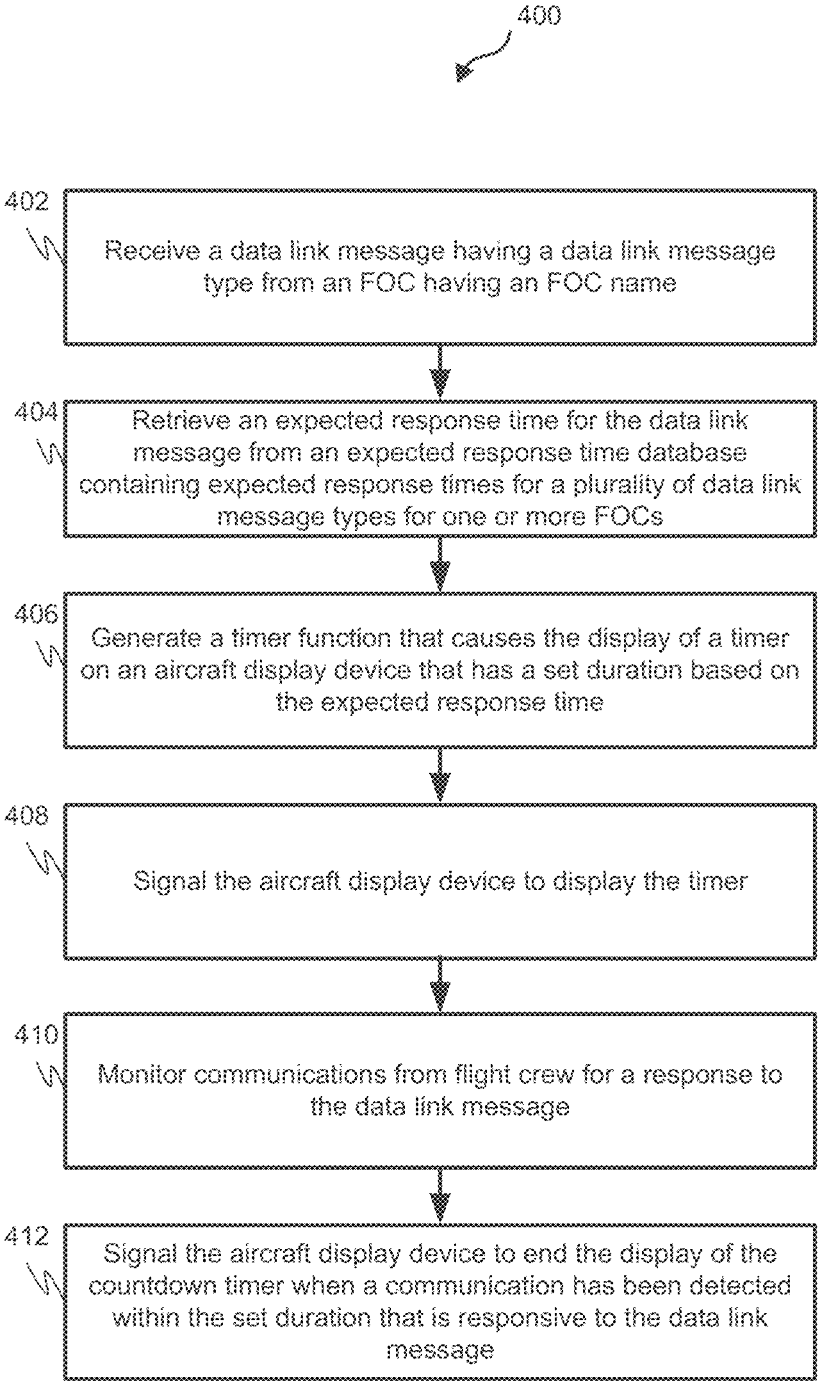
FIG. 4 is a process flow chart depicting an example process in an example datalink system, in accordance with some embodiments.

FIG. 4 is a process flow chart depicting an example process 400 in an example datalink system (e.g., datalink system 202). The order of operation within the process 400 is not limited to the sequential execution as illustrated in the figure but may be performed in one or more varying orders as applicable and in accordance with the present disclosure.

The example process 400 includes receiving a datalink message (e.g., CPDLC) having a message type from a FOC (flight operation center such as an ATC center) having an FOC name (operation 402) and retrieving an expected response time for the datalink message from an expected response time database containing expected response times for a plurality of datalink message types for one or more FOCs (operation 404).

The expected response time database may be preloaded onto the aircraft before flight or downloaded onto the aircraft during flight. The expected response time database may be searchable via input of an FOC name and an uplink element number for retrieving an expected response time for a specific response time for a specific FOC.

Retrieving an expected response time for the datalink message from the expected response time database may include: generating a query request for the expected response time database that includes the FOC name for the FOC from which the datalink message originated and an uplink element number that corresponds to the datalink message type of the datalink message; querying the expected response time database, using the query request, for an expected response time for the received datalink message; and retrieving a query result from the expected response time database that includes the expected response for the datalink message.

The example process 400 includes, generating a timer function that causes the display of a timer on an aircraft display device that has a set duration based on the expected response time (operation 406) and signaling the aircraft display device to display the timer (operation 408). The set duration of the timer may be equal to the expected response time retrieved from the expected response time database or some predetermined offset (greater than or less than) the retrieved expected response time.

The example process 400 includes monitoring communications from flight crew for a response to the datalink message (operation 410) and signaling the aircraft display device to end the display of the timer when a communication has been detected within the set duration that is responsive to the datalink message (operation 412).

The example process 400 may further include signaling the aircraft display device to display a Respond ASAP indication when a communication has not been detected within the set duration that is responsive to the datalink message. The example process 400 may further include signaling the aircraft display device to end the display of the Respond ASAP indication when a communication has been detected that is responsive to the datalink message. The Respond ASAP indication may include the words "Respond ASAP" or may include other words, phrases, images, etc.

that indicate to the flight crew that the timer has expired and that a response is still needed to the datalink message.

The subject matter described herein discloses apparatus, systems, techniques, and articles for advising flight crew in an aerial vehicle when to respond to a datalink message, such as a controller pilot datalink communication (CPDLC). In one embodiment, a flight deck system in an aircraft for enhancing controller pilot datalink communication (CPDLC) operation is provided. The flight deck system comprises a controller configured to: receive a CPDLC message having a CPDLC message type from a flight operation center (FOC) having an FOC name; retrieve an expected response time for the CPDLC message from an expected response time database containing expected response times for a plurality of CPDLC message types for one or more FOCs; generate a timer function that causes the display of a timer (e.g., countdown timer) on an aircraft display device that has a set duration based on the expected response time; signal the aircraft display device to display the timer; monitor communications from flight crew for a response to the CPDLC message; and signal the aircraft display device to end the display of the timer when a communication has been detected within the set duration that is responsive to the CPDLC message.

These aspects and other embodiments may include one or more of the following features. The controller may be further configured to signal the aircraft display device to display a Respond ASAP indication when a communication has not been detected within the set duration that is responsive to the CPDLC message. The controller may be further configured to signal the aircraft display device to end the display of the Respond ASAP indication when a communication has been detected that is responsive to the CPDLC message. The expected response time database may be preloaded onto the aircraft before flight or downloaded onto the aircraft during flight. The expected response time database may be searchable via input of an FOC name and an uplink element number for retrieving an expected response time for a specific response time for a specific FOC. To retrieve an expected response time for the CPDLC message from the expected response time database, the controller may be further configured to: generate a query request for the expected response time database that includes the FOC name for the FOC from which the CPDLC message originated and an uplink element number that corresponds to the CPDLC message type of the CPDLC message; query the expected response time database, using the query request, for an expected response time for the received CPDLC message; and retrieve a query result from the expected response time database that includes the expected response for the CPDLC message. The set duration of the timer may be equal to the expected response time retrieved from the expected response time database.

In another embodiment, a method in a flight deck system in an aircraft for enhancing controller pilot datalink communication (CPDLC) operation is provided. The method comprises: receiving a CPDLC message having a CPDLC message type from a flight operation center (FOC) having an FOC name; retrieving an expected response time for the CPDLC message from an expected response time database containing expected response times for a plurality of CPDLC message types for FOCs; generating a timer function that causes the display of a timer (e.g., countdown timer) on an aircraft display device that has a set duration based on the expected response time; signaling the aircraft display device to display the timer; monitoring communications from flight crew for a response to the CPDLC message; and signaling the aircraft display device to end the display of the timer when a communication has been detected within the set duration that is responsive to the CPDLC message.

These aspects and other embodiments may include one or more of the following features. The method may further comprise signaling the aircraft display device to display a Respond ASAP indication when a communication has not been detected within the set duration that is responsive to the CPDLC message. The method may further comprise signaling the aircraft display device to end the display of the Respond ASAP indication when a communication has been detected that is responsive to the CPDLC message. The expected response time database may be preloaded onto the aircraft before flight or downloaded onto the aircraft during flight. The expected response time database may be searchable via input of an FOC name and an uplink element number for retrieving an expected response time for a specific response time for a specific FOC. Retrieving an expected response time for the CPDLC message from the expected response time database may comprise: generating a query request for the expected response time database that includes the FOC name for the FOC from which the CPDLC message originated and an uplink element number that corresponds to the CPDLC message type of the CPDLC message; querying the expected response time database, using the query request, for an expected response time for the received CPDLC message; and retrieving a query result from the expected response time database that includes the expected response for the CPDLC message. The set duration of the timer may be equal to the expected response time retrieved from the expected response time database.

In another embodiment, a non-transitory computer readable medium encoded with programming instructions configurable to cause a controller in a flight deck system in an aircraft to perform a method for enhancing controller pilot datalink communication (CPDLC) operation is provided. The method comprises: receiving a CPDLC message having a CPDLC message type from a flight operation center (FOC) having an FOC name; retrieving an expected response time for the CPDLC message from an expected response time database containing expected response times for a plurality of CPDLC message types for FOCs; generating a timer function that causes the display of a timer (e.g., countdown timer) on an aircraft display device that has a set duration based on the expected response time; signaling the aircraft display device to display the timer; monitoring communications from flight crew for a response to the CPDLC message; and signaling the aircraft display device to end the display of the timer when a communication has been detected within the set duration that is responsive to the CPDLC message.

These aspects and other embodiments may include one or more of the following features. The method may further comprise signaling the aircraft display device to display a Respond ASAP indication when a communication has not been detected within the set duration that is responsive to the CPDLC message. The method may further comprise signaling the aircraft display device to end the display of the Respond ASAP indication when a communication has been detected that is responsive to the CPDLC message. The expected response time database may be searchable via input of an FOC name and an uplink element number for retrieving an expected response time for a specific response time for a specific FOC. Retrieving an expected response time for the CPDLC message from the expected response time database may comprise: generating a query request for the expected response time database that includes the FOC name for the FOC from which the CPDLC message originated and an uplink element number that corresponds to the CPDLC message type of the CPDLC message; querying the expected response time database, using the query request, for an expected response time for the received CPDLC message; and retrieving a query result from the expected response time database that includes the expected response for the CPDLC message. The set duration of the timer may be equal to the expected response time retrieved from the expected response time database.

In another embodiment, a flight deck system in an aircraft for enhancing controller pilot datalink communication (CPDLC) operation is provided. The flight deck system comprises a controller configured to: access an expected response time database containing expected response times for a plurality of CPDLC message types for FOCs, wherein the expected response times are searchable via input of a flight operation center (FOC) name and an uplink element number, wherein the expected response time database is preloaded onto the aircraft before flight or downloaded onto the aircraft during flight; receive a CPDLC message having a CPDLC message type from an FOC having an FOC name; generate a query request for the expected response time database that includes the FOC name for the FOC from which the CPDLC message originated and an uplink element number that corresponds to the CPDLC message type of the CPDLC message; query the expected response time database, using the query request, for an expected response time for the received CPDLC message; retrieve a query result from the expected response time database that includes the expected response for the CPDLC message; generate a timer function that causes the display of a timer (e.g., countdown timer) on an aircraft display device that has a set duration based on (or equal to) the expected response time; signal the aircraft display device to display the timer; monitor communications from flight crew for a response to the CPDLC message; signal the aircraft display device to end the display of the timer when a communication has been detected within the set duration that is responsive to the CPDLC message; signal the aircraft display device to display a Respond ASAP indication when a communication has not been detected within the set duration that is responsive to the CPDLC message; and signal the aircraft display device to end the display of the Respond ASAP indication when a communication has been detected that is responsive to the CPDLC message.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system in an aircraft for enhancing controller pilot datalink communication (CPDLC) operation, the flight deck system comprising:

an aircraft display device in the aircraft; and a controller configured to:

receive a CPDLC message having a CPDLC message type from a flight operation center (FOC) having an FOC name;

retrieve an expected response time for the CPDLC message from an expected response time database containing expected response times for a plurality of CPDLC message types for FOCs, wherein the expected response time database is searchable via input of an FOC name and an uplink element number for retrieving an expected response time for a specific CPDLC message type for a specific FOC;

generate a timer function that causes the display of a timer on the aircraft display device that has a set duration based on the expected response time;

signal the aircraft display device to display the timer;

monitor communications from flight crew fora response to the CPDLC message; and signal the aircraft display device to end the display of the timer when a communication has been detected within the set duration that is responsive to the CPDLC message.

2. The flight deck system of claim 1, wherein the controller is further configured to signal the aircraft display device to display a Respond ASAP indication when a communication has not been detected within the set duration that is responsive to the CPDLC message.

3. The flight deck system of claim 2, wherein the controller is further configured to signal the aircraft display device to end the display of the Respond ASAP indication when a communication has been detected that is responsive to the CPDLC message.

4. The flight deck system of claim 1, wherein the expected response time database is preloaded onto the aircraft before flight or downloaded onto the aircraft during flight.

5. The flight deck system of claim 1, wherein to retrieve an expected response time for the CPDLC message from the expected response time database the controller is further configured to:

generate a query request for the expected response time database that includes the FOC name for the FOC from which the CPDLC message originated and an uplink element number that corresponds to the CPDLC message type of the CPDLC message;

query the expected response time database, using the query request, for an expected response time for the received CPDLC message; and retrieve a query result from the expected response time database that includes the expected response for the CPDLC message.

6. The flight deck system of claim 1, wherein the set duration of the timer is equal to the expected response time retrieved from the expected response time database.

7. A method in a flight deck system in an aircraft for enhancing controller pilot datalink communication (CPDLC) operation, the method comprising:

receiving a CPDLC message having a CPDLC message type from a flight operation center (FOC) having an FOC name;

retrieving an expected response time for the CPDLC message from an expected response time database containing expected response times for a plurality of CPDLC message types for FOCs, wherein the expected response time database is searchable via input of an FOC name and an uplink element number for retrieving an expected response time for a specific CPDLC message type for a specific FOC;

generating a timer function that causes a timer to be displayed on an aircraft display device that has a set duration based on the expected response time;

signaling the aircraft display device to display the timer;

monitoring communications from flight crew for a response to the CPDLC message; and signaling the aircraft display device to end the display of the timer when a communication has been detected within the set duration that is responsive to the CPDLC message.

8. The method of claim 7, further comprising signaling the aircraft display device to display a Respond ASAP indication when a communication has not been detected within the set duration that is responsive to the CPDLC message.

9. The method of claim 8, further comprising signaling the aircraft display device to end the display of the Respond ASAP indication when a communication has been detected that is responsive to the CPDLC message.

10. The method of claim 7, wherein the expected response time database is preloaded onto the aircraft before flight or downloaded onto the aircraft during flight.

11. The method of claim 7, wherein retrieving an expected response time for the CPDLC message from the expected response time database comprises:

generating a query request for the expected response time database that includes the FOC name for the FOC from which the CPDLC message originated and an uplink element number that corresponds to the CPDLC message type of the CPDLC message;

querying the expected response time database, using the query request, for an expected response time for the received CPDLC message; and retrieving a query result from the expected response time database that includes the expected response for the CPDLC message.

12. The method of claim 7, wherein the set duration of the timer is equal to the expected response time retrieved from the expected response time database.

13. A non-transitory computer readable medium encoded with programming instructions configurable to cause a controller in a flight deck system in an aircraft to perform a method for enhancing controller pilot datalink communication (CPDLC) operation, the method comprising:

receiving a CPDLC message having a CPDLC message type from a flight operation center (FOC) having an FOC name;

retrieving an expected response time for the CPDLC message from an expected response time database containing expected response times for a plurality of CPDLC message types for FOCs, wherein the expected response time database is searchable via input of an FOC name and an uplink element number for retrieving an expected response time for a specific CPDLC message type for a specific FOC;

generating a timer function that causes a timer to be displayed on an aircraft display device that has a set duration based on the expected response time;

signaling the aircraft display device to display the timer;

monitoring communications from flight crew fora response to the CPDLC message; and signaling the aircraft display device to end the display of the timer when a communication has been detected within the set duration that is responsive to the CPDLC message.

14. The non-transitory computer readable medium of claim 13, wherein the method further comprises signaling the aircraft display device to display a Respond ASAP indication when a communication has not been detected within the set duration that is responsive to the CPDLC message.

15. The non-transitory computer readable medium of claim 14, wherein the method further comprises signaling the aircraft display device to end the display of the Respond ASAP indication when a communication has been detected that is responsive to the CPDLC message.

16. The non-transitory computer readable medium of claim 13, wherein retrieving an expected response time for the CPDLC message from the expected response time database comprises:

generating a query request for the expected response time database that includes the FOC name for the FOC from which the CPDLC message originated and an uplink element number that corresponds to the CPDLC message type of the CPDLC message;

querying the expected response time database, using the query request, for an expected response time for the received CPDLC message; and retrieving a query result from the expected response time database that includes the expected response for the CPDLC message.

17. The non-transitory computer readable medium of claim 13, wherein the set duration of the timer is equal to the expected response time retrieved from the expected response time database.

18. The non-transitory computer readable medium of claim 13, wherein the expected response time database is preloaded onto the aircraft before flight.

19. The non-transitory computer readable medium of claim 13, wherein the expected response time database is downloaded onto the aircraft during flight.

* * * * *